United States Patent

[11] 3,574,943

[72] Inventors Marvin M. Stark
Los Altos Hills;
Ronald J. Nicholson, San Jose, Calif.
[21] Appl. No. 805,790
[22] Filed Mar. 10, 1969
[45] Patented Apr. 13, 1971
[73] Assignee The Regents of the University of California
Berkeley, Calif.

[54] DENTAL CAVITY LINER AND METHOD OF RESTORING CARIOUS TEETH
3 Claims, No Drawings
[52] U.S. Cl. .................................................. 32/15
[51] Int. Cl. .................................................. A61k 5/02
[50] Field of Search .......................................... 32/8, 15

[56] References Cited
UNITED STATES PATENTS
3,254,411 6/1966 Shelly .......................... 32/15

*Primary Examiner*—Robert Peshock
*Attorney*—Lothrop & West

ABSTRACT: Concerned is a method of and substance for use in restoring a carious tooth from which the carious material has been removed. The cavity so formed is lined with a layer of a polysiloxane, pressure sensitive, adhesive polymer dissolved in a fluorocarbon and then filled with an amalgam, thus providing a nonleaking repair.

DENTAL CAVITY LINER AND METHOD OF RESTORING CARIOUS TEETH

The repair of dental caries has been accomplished more or less successfully in a large number of different ways. Quite often the carious material is removed mechanically from the remainder of the tooth to establish a cavity of a predetermined or corresponding configuration. Thereafter filling of the cavity is accomplished by the use of various materials, often a silver-mercury amalgam put into place with the intention that it occupy the entire cavity. Difficulty arises in that the amalgam (or other filling) does not always completely prevent access between the exterior and the interior of the tooth. Leakage occurs and this may then be followed by quick deterioration of the repair.

It is therefore an object of the invention to provide an improved method of restoring a carious tooth.

Another object of the invention is in general to provide an improved manner of treating teeth.

A further object of the invention is to provide a seal at the interface between tooth material and filling material.

Another object of the invention is to provide an improved sealant for use in dental work.

A further object of the invention is in general to provide an improved technique of care for defective teeth.

Other objects together with the foregoing are attained in the embodiment of the invention described in the accompanying description disclosing a representative method of a representative material, it being understood that variations therein can be made within the ambit of the invention and the scope of the claims.

Tooth material can be removed and replaced for various reasons and the present disclosure is applicable generally thereto, although caries is referred to herein as representative.

In the preferred clinical manner of carrying out the method of the invention, the tooth to be repaired is initially deprived of the defective or carious material by the usual manner of mechanical removal to leave an appropriate cavity later to be filled.

Upon the completion of the preparation of the cavity with appropriately exposed healthy surfaces, we coat or line the so-exposed cavity surfaces of the tooth with a particular material. This is a polysiloxane, pressure sensitive, adhesive polymer which is commercially available dissolved in a fluorocarbon and is known in commerce as "Medical Adhesive 'B'", sold by Dow Corning. So far as we are aware, this material, although on the market for some time, has been utilized solely as an adhesive for externally applying various surgical dressings, prosthetic devices and ostomy appliances to the human skin. We have discovered that this material is a superior cavity lining substance for use as indicated. The adhesive nature of the substance is not relied upon in our method and is immaterial, although it is not detrimental nor does it interfere in any way with the dental use. We have discovered as a result of extensive clinical tests and demonstrations that the polysiloxane, pressure sensitive polymer dissolved in the fluorocarbon does in fact make an excellent cavity liner and sealant and does tend to close communication into and out of the otherwise exposed tooth material.

In carrying out the method, following the preparation of the interior of the tooth, the polysiloxane substance is preferably sprayed into the cavity to provide a uniform lining layer or coating. After a short wait, say 2 minutes, for air drying the method is completed by introducing the customary amalgam filling into the cavity. The amalgam is hand condensed in the customary fashion and the restoration is finished in the usual way.

We have found that the solvent carried polysiloxane material as identified hereinbefore is quite effective to afford a sealant between the tooth and the amalgam even though there might be some slight discrepancies in the configurations of both. The result is that there is substantially no interflow between the two, the polysiloxane layer acting as a barrier to leakage.

We have demonstrated the improved results of the foregoing technique with extracted human bicuspids evenly divided into a control group and a trial group. All were given class V cavity preparations and the trial group was sprayed with one application of polysiloxane pressure sensitive adhesive polymer dissolved in a fluorocarbon, with the material covering the cavo-surface angles. After 2 minutes hand condensed amalgam restorations were placed in both groups. The root tips of all teeth were cut off and the canals sealed with amalgam to prevent leakage through the apices. Both groups were placed in a 0.25 percent solution of sodium fluorescein and cycled through temperature baths of 4°C., 37° C. and 60° C. Each bath persisted for 1 minute and was repeated 10 times for a total of 30 minutes.

Following this all teeth of both groups were sectioned buccal-lingually along the long axis of the teeth and each section was visually examined under ultraviolet light and with magnification for marginal leakage. The teeth of the control group (unsprayed) showed substantial marginal leakage seen as a concentration of fluorescein dye just under the amalgam restorations and in some cases radiating toward and into the pulp along the path of the dentinal tubules. In none of the trial group (sprayed) was any marginal leakage observed.

A similar test was made in vivo, using a Rhesus monkey, with control and trial bicuspids and molars treated, as above, and remaining in vivo for one month during which time the monkey drank, ad lib., a water supply containing 0.25 percent fluorescein. Following extraction the two groups of teeth were treated, as above, and both with magnification under ultraviolet light and following X-ray filming the control teeth showed substantial marginal leakage and the trial or treated teeth no marginal leakage. Other trials, as above, have yielded consistent results.

Review of the results of this technique over a prorated period of time has indicated that marginal leakage around amalgam restorations is apparently permanently precluded, that there are no deleterious effects from the use of the material, and that the restoration of the tooth is entirely satisfactory.

We claim:

1. A method of restoring a carious tooth comprising mechanically removing the carious material to provide a cavity, then lining the wall of the cavity so formed with an application of a polysiloxane pressure-sensitive adhesive polymer dissolved in a fluorocarbon, and then filling the so lined cavity with amalgam.

2. The step in a method of depositing filling material in a tooth consisting of interposing a layer of a polysiloxane pressure-sensitive adhesive polymer dissolved in a fluorocarbon between the material of said tooth and sail filling material in said tooth.

3. As a liner for the wall of a tooth cavity, a layer of polysiloxane pressure-sensitive adhesive polymer dissolved in a fluorocarbon.